United States Patent [19]

Mascenik

[11] Patent Number: 5,631,882
[45] Date of Patent: May 20, 1997

[54] DISK CHANGER DEVICE FOR USE WITH A PERSONAL COMPUTER AND CONTROL METHOD FOR SAME

[75] Inventor: Stephen Mascenik, Torrance, Calif.

[73] Assignee: Nakamichi Corporation, Tokyo, Japan

[21] Appl. No.: 261,990

[22] Filed: Jun. 17, 1994

[51] Int. Cl.$^6$ .................................................. G11B 17/22
[52] U.S. Cl. ........................ 369/30; 369/34; 369/38; 369/75.2
[58] Field of Search ..................... 369/30, 36, 37–39, 369/75.2, 75.1, 178, 191, 192; 360/98.01, 98.06

[56] References Cited

U.S. PATENT DOCUMENTS

| | | | |
|---|---|---|---|
| 5,299,182 | 3/1994 | Sakiyama | 369/36 |
| 5,384,760 | 1/1995 | Xumakura | 369/38 |

OTHER PUBLICATIONS

Pioneer Manual DRC1008, pp. 8, 9, 14, 15; Describing CD changer system connections and magazine loading.
Pioneer Manual DRB1092, pp. 23–35; McIntosh/Pioneer device driver.

*Primary Examiner*—Ali Neyzari
*Attorney, Agent, or Firm*—Morrison Law Firm

[57] ABSTRACT

A CD changer system has a CD changer which operates in conjunction with a driver program and a personal computer. The CD changer has a magazine for storing disks at a plurality of disk storage locations and a transport mechanism for individual loading disks in the magazine. The driver program displays storage icons corresponding to the disk storage locations and allows a user to operate the CD changer via input from a mouse. The user check marks, or tags, selected storage icons to control whether the CD changer reads directory data from disks to be stored in corresponding storage locations. Once a storage icon is tagged, a disk associated with the storage icon cannot be ejected from the CD changer until the tagged storage icon is untagged. The driver program allows the user to select a number of disks in the storage locations for a sequential ejecting and loading operation.

11 Claims, 6 Drawing Sheets

DISK CHANGER DEVICE FOR USE WITH A PERSONAL COMPUTER AND CONTROL METHOD FOR SAME

BACKGROUND OF THE INVENTION

The present invention relates to a drive method for CD ROM changer/reader, with a magazine, that functions in conjunction with a personal computer. In particular, the present invention relates to a CD changer and a driving program for operating the CD changer in conjunction with the personal computer.

CD ROM changers with magazines currently exist, of which one type is Pioneer Corp.'s CD-ROM changer model DRM-604X. This CD changer has a magazine for holding a plurality of CDs, or disks, which is detachably held in the main body of the CD changer. To perform a reading operation, a disk stored in the uppermost level of the magazine is brought to a playback position where a disk reader reads directory data from the disk. The directory data is then stored in a memory of a personal computer after which the CD changer enters a stand-by state. This storing of directory is referred to as the mounting operation. Operation of this CD changer can also be effected using a driver program run on the personal computer. The driver program allows a user effect the mounting operation only upon selected disks in the magazine Several disadvantages are associated with the above CD changer. For example, when the above CD changer is used without the driver program the mounting operation described above is performed regardless of a user's desires. Furthermore, when the magazine is removed and reinstalled, the CD changer must mount each disk to determine if there are any changes made. Thus, if the disk is in the uppermost level is not going to be used, this is a unnecessary operation.

Another disadvantage is that loading of a disk into the magazine requires that the magazine be removed from the CD change. Once the magazine is removed, a disk must be installed in a prescribed holder in the magazine. Once the disk is installed, the magazine must then reinstalled into the CD changer. This operation exposes the magazine to the possibility of damage and also allows a user to inadvertently replace a disk other than an intended disk. When such a mistake occurs, the replaced disk does not match the directory data stored during the mounting operation. Additionally, since the replaced disk is in an erroneous storage location, the user is prone to attempt to mount the disk remaining in the intended storage location. Once it is discovered that the disk has been erroneously stored, the user must either eject the magazine or mount each disk until the replaced disk is found.

OBJECTS AND SUMMARY OF THE INVENTION

Accordingly, it is an object of the invention to provide a CD changer system which overcomes the drawbacks of the prior art.

It is a further object of the invention to provide a CD changer system which allows flexibility in loading and unloading disks.

It is a still further object of the invention to provide a CD changer system which minimizes the number of reading operations performed.

It is yet another object of the invention to provide a CD changer system which reduces the possibility of disk loading errors.

An object of the present invention is to provide a CD changer system with a driver program which provides a user friendly interface with the CD changer.

Another object of the present invention is to provide a method of operating a CD changer which provides an intuitive interface for a user.

Additionally, an object of the present invention is to provide a method of operating a CD changer which minimizes loading errors and unnecessary reading of data.

Yet another object of the present invention is to provide a method of CD changer operation providing for sequential unloading and loading of selected disk storage locations to facilitate ease of operation.

Briefly stated, the present invention provides a CD changer system having a CD changer which operates in conjunction with a driver program and a personal computer. The CD changer has a magazine for storing disks at a plurality of disk storage locations and a transport mechanism for individual loading disks in the magazine. The driver program displays storage icons corresponding to the disk storage locations and allows a user to operate the CD changer via input from a mouse. The user check marks, or tags, selected storage icons to control whether the CD changer reads directory data from disks to be stored in corresponding storage locations. Once a storage icon is tagged, a disk associated with the storage icon cannot be ejected from the CD changer until the tagged storage icon is untagged. The driver program allows the user to select a number of disks in the storage locations for a sequential ejecting and loading operation.

In accordance with these and other objects of the invention, there is provided a disk changer system for storing and playing disks comprising: a disk changer; the disk changer including a magazine for storing disks at a plurality of disk storage locations within the magazine; the disk changer including means for reading a selected disk of the disks stored within the magazine when the selected disk is at a playback position; the disk changer including a transport system for transporting disks between the magazine, the playback position, and an eject position; display means for displaying information; control means for controlling the disk changer and the display means; the control means including a memory and a means for inputting data to the control means; the control means including means for displaying disk storage location symbols, on the display means, wherein the disk storage location symbols each correspond to a respective one of the disk storage locations; the control means including means, responsive to the means for inputting, for displaying the disk storage location symbols in one of a first state and a second state; the control means including first loading control means, responsive to the disk storage location symbols in the first state, for actuating the disk changer to accept a disk external to the disk changer at the eject position, read data on the disk, transfer the data to the memory, and store the disk at one of the plurality of disk storage positions corresponding to one of the disk storage location symbols in the first state; and the control means including second loading control means, responsive to the disk storage location symbols in the second state, for actuating the disk changer to store a disk external to the disk changer at the eject position into one of the plurality of disk storage positions, corresponding to the one of the disk storage location symbols in the second state, without reading the disk.

According to a feature of the invention, there is further provided a disk changer system for storing and playing disks comprising: a disk changer; the disk changer including a magazine for storing disks at a plurality of disk storage locations within the magazine; the disk changer including means for reading a selected disk of the disks stored within the magazine when the selected disk is at a playback position; the disk changer including means for reading a selected disk of the disks stored within the magazine when the selected disk is at a playback position; the disk changer including a transport system for transporting disks between the magazine, the playback position, and an eject position; display means for displaying information; control means for controlling the disk changer and the display means; the control means including a memory and a means for inputting data to the control means; the control means including means for displaying disk storage location symbols, on the display means, wherein each the disk storage location symbols correspond to a respective one of the disk storage locations; and the control means including loading control means, responsive to selection of selected ones of the disk storage location symbols, for actuating the disk changer to accept a disk external to the disk changer, read data on the disk, transfer the data to the memory, and store the disk at one of the plurality of disk storage positions corresponding to one of the selected ones of the disk storage location symbols.

According to a still further feature of the invention, there is further provided a disk changer system for storing and playing disks comprising: a disk changer; the disk changer including a magazine for storing disks at a plurality of disk storage locations within the magazine; the disk changer including means for reading a selected disk of the disks stored within the magazine when the selected disk is at a playback position; control means for controlling the disk changer; the disk changer including means for installing and removing a selected disk from the magazine; the means for installing and removing including a transport system for transporting disks between the magazine, the playback position, and an eject position; means for selecting disk storage locations for removal of disks; the control means includes means for controlling the disk changer to effect sequential removal and installation of disks, from the selected disk storage locations, in response to the means for selecting.

The present invention also includes the above embodiments wherein, the disk changer includes means for installing and removing a selected disk from the magazine; and the control means includes means for disabling the disk changer from removing a selected disk from the magazine when data has been read from the selected disk.

Accordingly, a further feature of the present invention provides a method for controlling a disk changer having a plurality of disk storage locations, means for loading and unloading disks to and from the disk storage locations, a disk reader for reading disks from the disk storage locations, and means for selecting and un-selecting disk storage locations, comprising: selecting disk storage locations; reading data from disks stored and destined for storage in selected disk storage locations; and disabling the means for loading and unloading from unloading disks in the selected storage locations until the selected storage locations are un-selected.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
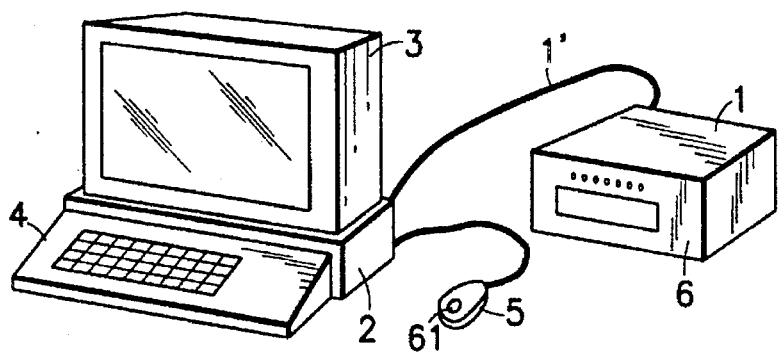
FIG. 1 is perspective view drawing of the CD changer drive system of the present invention.

Referring to FIG. 1, an embodiment of a compact disc (CD) changer 1 of the present invention is shown along with a personal computer 2. The personal computer 2 has a display monitor 3, a keyboard 4 and a mouse 5. The personal computer 2 and the CD changer 1 are connected by a cable 1' over which the personal computer 2 accesses information stored on CD's held in the CD changer 1. The CD changer 1 thus functions as a mass read-only-memory (ROM) device by which the personal computer 1 can access large amounts of data stored on a plurality of CD's held in the CD changer 1. While the CD changer 1 is shown as a stand alone device in FIG. 1, alternative embodiments of the present invention incorporate a CD changer into the personal computer 2.

Figure 2:
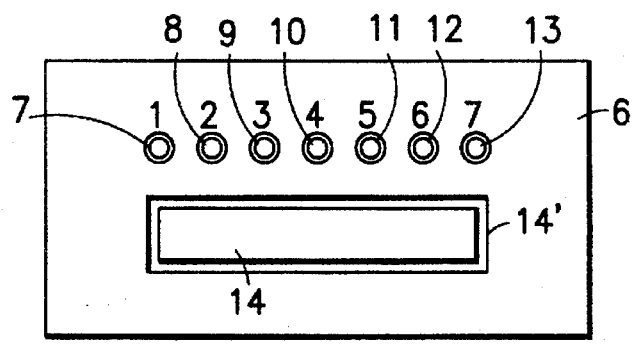
FIG. 2 is a front view drawing of a front panel of the CD changer of FIG. 1.
Figure 3:
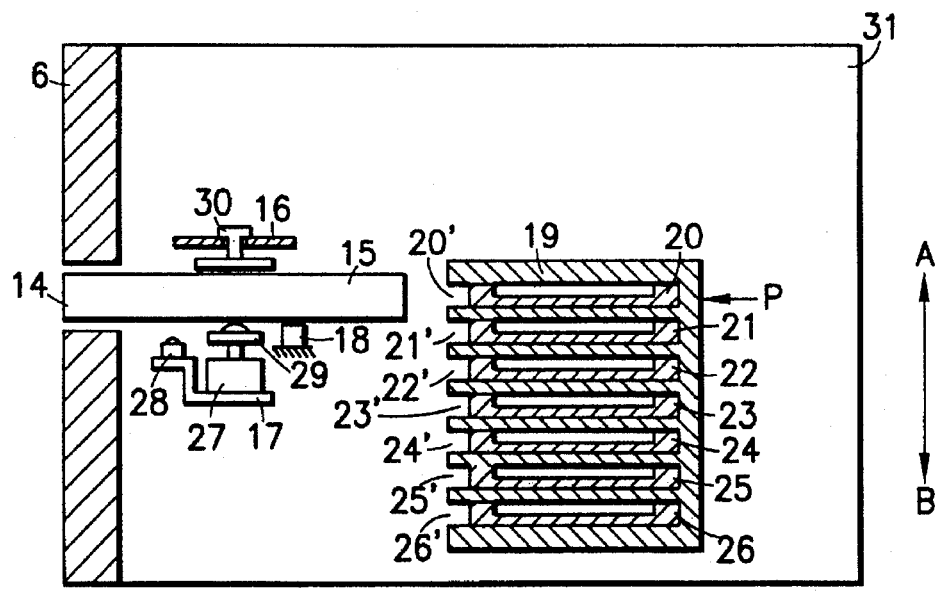
FIG. 3 is a drawing of a cross-section of the CD changer of FIG. 1 with all carriages stored in a magazine.

Referring to FIGS. 2 and 3, a front panel 6 of the CD changer 1 has select buttons 7–13, each corresponding to one of seven carriages 20–26 held in the CD changer 1 and having a corresponding designation, 1–7. The front panel 6 has an aperture 14' dosed by a disk tray front panel 14, of a disk tray 15 (shown in FIG. 3). The disk tray 15 is extendable, beyond the front panel 6 to an exit position for loading and unloading disks. The disk tray front panel 14 lies flush with the front panel 6 when the disk tray is in a retracted position, thus closing the front panel 6.

Figure 4:
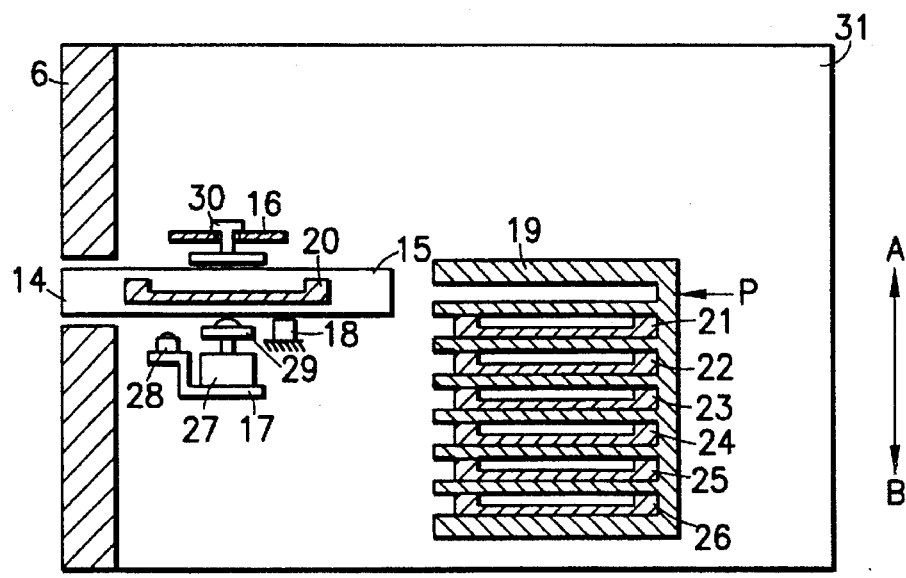
FIG. 4 is a drawing of a cross-section of the CD changer of FIG. 1 with one of carriages at a playback position.
Figure 5:
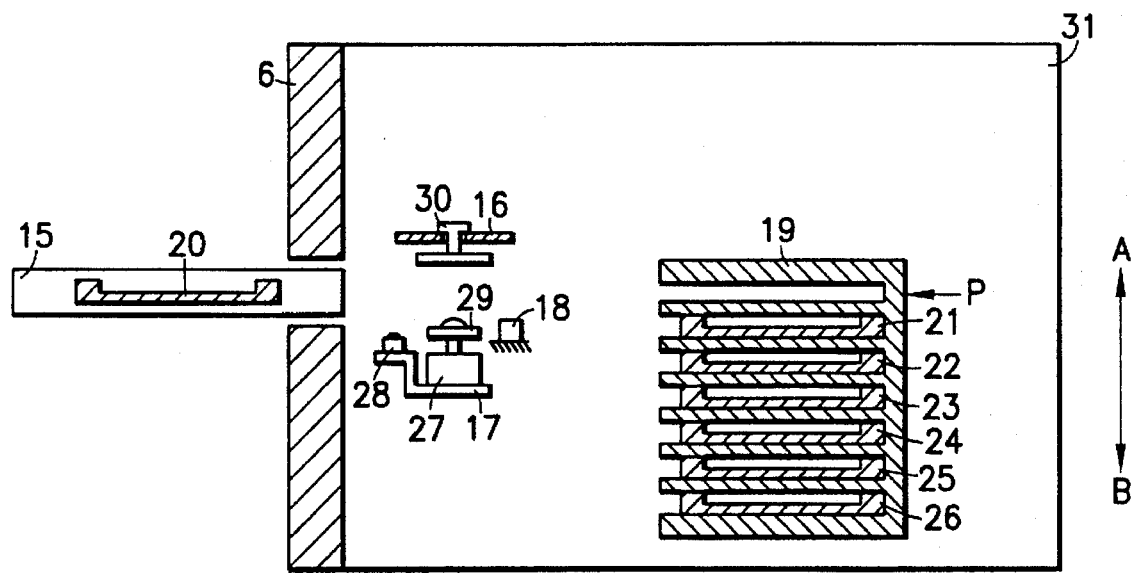
FIG. 5 is a drawing of a cross-section of the CD changer of FIG. 1 with one of the carriages at an eject position.

Referring to FIGS. 3–5, a sequence of CD changer operations is illustrated wherein the first carriage 20 is extended by the disk tray 15 to the eject position. In FIG. 3, the disk tray 15 is shown situated at a load position above a disk reader assembly 17'. The tray 15 is slidably supported within a chassis 31 to permit sliding operation between the load position, shown in FIG. 3, and an eject position shown in FIG. 5. A magazine 19 is permanently held in the CD changer 1. The magazine 19 is also slidably supported within the chassis 31 to permit alignment of any one of seven carriages, 20–26, with the disk tray 15 at the load position. The magazine 19 is moved up and down by an alignment mechanism (not shown), parallel to the A–B axis shown in FIGS. 3–5, to position a selected carriage in alignment with a plane of operation of the disk tray 15 at a store position P. For example, in FIG. 3 the first carriage 20 is aligned with the store position P, while the remaining carriages, 21–26, are supported concentrically within the magazine 19 in receptacle areas, below the first carriage 20. The carriages, 21–26, are arranged sequentially with the second carriage 21 being situated beneath the first carriage 20, and so on. The tray 15 and first carriage 20 are shown in the load position in FIG. 4, and are shown in the eject position in FIG. 5.

Operation of the CD changer 1 is optionally initiated by depressing one of the select buttons, 7–13, corresponding to a desired one of disk storage locations 20'–26'. For the purposes of the following description, the first select button 7 is selected with all the carriages 21–26 in the magazine, as shown in FIG. 3, and it is presumed that none of the select buttons are in a lock-out state, which is discussed below. Following the depression of the first select button 7, the magazine 19 is aligned with the first carriage 20 at the entry position P as shown in FIG. 3. The first carriage 20 is then moved by a carriage transport mechanism (not shown) from a store position (the storage location 20' in the magazine 19 aligned with the entry position) in the magazine 19, to the load position in the tray 15 as shown in FIG. 4. The load position also corresponds to a playback position since it is aligned with a turntable 29 of the disk reader assembly 17'. After the first carriage 20 is inserted into the disk tray 15, the disk tray 15 is transported to the eject position as shown in FIG. 5 by a tray transport mechanism (not shown).

Once the first carriage 20 is at the eject position, the user can then insert a disk into the first carriage 20. Then, the user once again selects the first select button 7 to install the disk into the CD changer 1. The tray 15 and first carriage 20 are first returned to the load position. The first carriage 20 is then transported into the store position in the magazine 19 where the disk is stored for future use.

In the alternative, when the first carriage 20 and tray 15 are at the eject position, the user may decide that a different carriage is desired. In such an instance, the user depresses a select button corresponding to the desired carriage selection. For example, if the user desires that the seventh carriage 26 be brought to the eject position, instead of the first carriage 20, the user depresses the seventh select button 13 to select the seventh carriage 26. Upon the depression of the seventh select button 13, the CD changer 1 returns the first carriage 20 to the store position as discussed above. The magazine 19 is then moved in the A direction so that the seventh carriage 26 is aligned with the store position (entry position P). The seventh carriage 26 is then first transported to the load position and then to the eject position as described above with reference to the first carriage 20. Each of the other carriages may be similarly selected by use of a corresponding one of the select buttons 7–13.

The disk reader assembly 17' includes the turntable 29 driven by a drive motor 27 and an optical pick-up 28 mounted on a support bracket 17. A clamper 30 is mounted on a support 16. The disk reader assembly 17' is actuated to clamp a disk, at the load position, between the turntable 29 and the clamper 30. Various mechanisms may be employed to effect the clamping. In the present embodiment the disk reader assembly is raised on support bracket 17 in direction A to clamp the disk at the load position against the clamper 30. The mechanism for this clamping is not shown as it may be realized by those of ordinary skill in the art having viewed this disclosure. Furthermore, alternative clamping arrangements are considered to be within the scope and spirit of the present invention.

The disk reader assembly 17' is equipped with a disk detector 18 which optically detects the presence of a disk at the load position. Once at the load position, the disk reflects light emitted by the disk detector 18 back into the disk detector 18 indicating that a disk is present. While the present embodiment uses a reflecting type optical sensor, other sensor devices may also be employed in the current invention. Each time a disk is transported into the magazine 19, the disk detector senses the presence of the disk and a controller stores this information in a memory location associated with a position of one of the first through seventh storage positions, in the magazine 19, into which the disk is transferred.

When the CD changer 1 is in a stop state, wherein all disks are stored in the magazine 19, a playback request begins a series of steps starting with the proper alignment of a selected carriage with the store position. The selected carriage is then transported to the load position. Once in the load position, the disk carried in the selected carriage is clamped between the turntable 29 and the clamper 30. The drive motor 27 is then actuated to rotate the disk. The optical pick-up is then actuated to perform focusing and tracking functions known in the art. The disk is then read by the optical pick-up 28, which moves along support bracket 17 to scan the disk.

Referring to FIG. 1 again, the CD changer 1 is designed to operate in conjunction with the personal computer 2, display monitor 3, keyboard 4 and mouse 5. In operation, the personal computer 2 runs a driver program which controls the CD changer 1 through the cable 1'. Thus, the present invention further includes the operation and control of the CD changer 1 by the personal computer 2 as discussed below.

Figure 6:
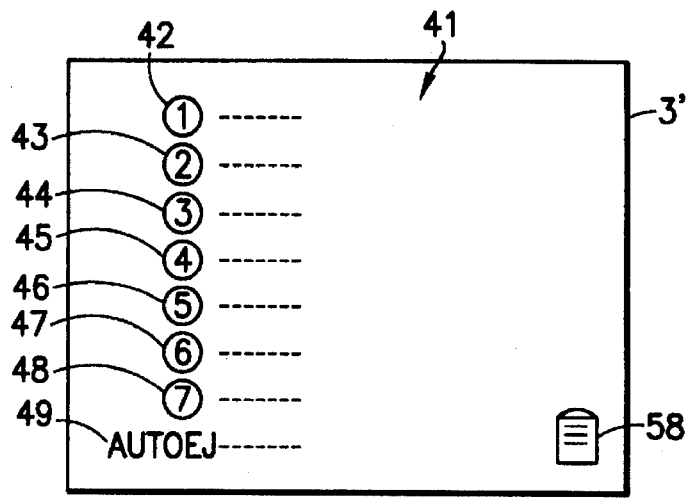
FIG. 6 is a drawing of a display screen of a driver program of the present invention.
Figure 8:
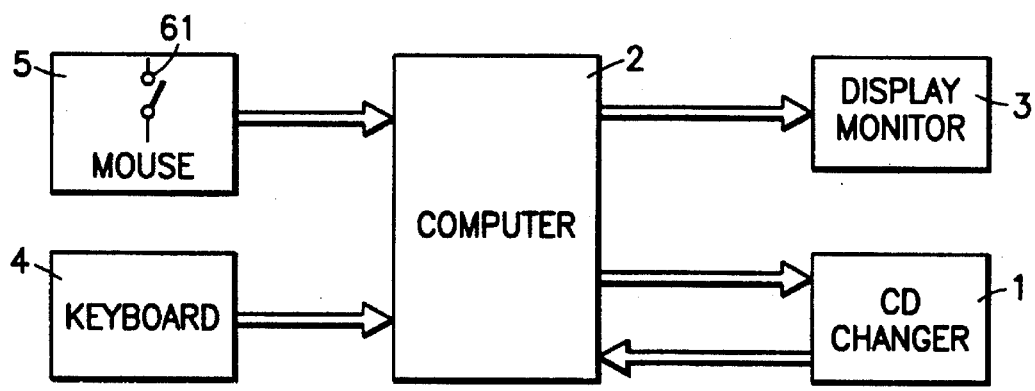
FIG. 8 is a block diagram indicating the flow of system signals in the present invention.

Referring to FIGS. 1, 6, and 8, operation of the driver program is presented. In FIG. 6, a main driver screen 3' for controlling the CD changer 1 is on the display monitor 3. The driver program accepts input from the mouse 5 which moves a cursor 41 about the screen of the display monitor 3. First through seventh storage location icons, 42–48, are displayed on the main driver screen 3' and correspond to respective ones of the first through seventh carriages, 20–26, held in the CD changer 1, as do the select buttons 7–13 on the front panel 6 of the CD changer 1.

The operation of the driver program is described below with reference to the use of the mouse 5, however, operation may similarly be effected using the keyboard 4 wherein the steps described are substantially the same. The present invention includes both modes of operation. Use of the driver program begins first with calling up the driver program by loading and executing the driver program. Once running, the driver program displays the main driver screen 3' and the user then interfaces with the personal computer 2 by operating the mouse 5.

Figure 7:
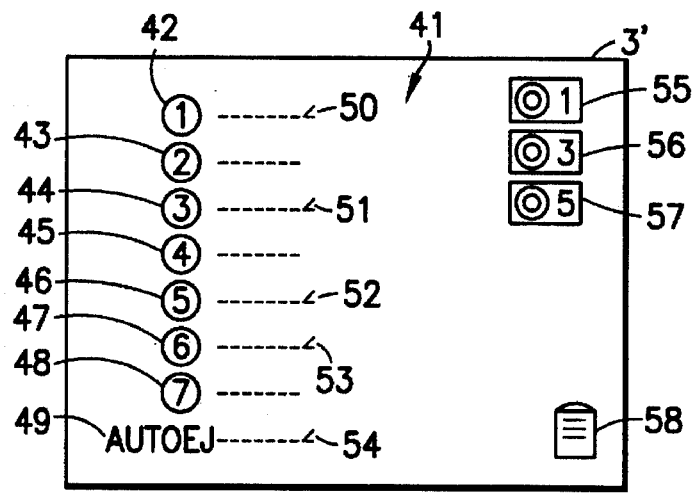
FIG. 7 is a drawing of the display screen of FIG. 6 illustrating disk icons.

Referring now to FIGS. 1, 6 and 7, use of the driver program is explained. For purposes of this example, it is presumed that the CD changer 1 contains some CD's, however, the user is not aware of how many and where the CD's are stored. In order to determine the status of particular storage locations in the magazine 19, the user manipulates the mouse 5 to put the cursor 41 near desired ones of the storage location icons 42–48 and then clicks the mouse to put check marks 50–53 next to the desired numbers. The check marks, 50–53, may be removed by placing the cursor next to the storage location icon of the check mark to be removed and clicking the mouse 5. The operation of the mouse 5 thus toggles the check marking, or tagging, of the storage location icons 42–48.

It is realized that in alternative embodiments of the present invention the select buttons 7–13 can be eliminated and replaced by select icons (not shown) displayed on the main driver screen 3'. A user then actuates a desired select icon by placing the cursor 41 on a select icon and clicking the mouse button 61. Such an arrangement is particularly suited to the incorporation of the CD changer 1 into the personal computer 2 since all control can then be effected via the main driver display 3'.

Once a check mark is placed on one of the storage location icons 42–48, the driver program then examines whether there is a disk in a corresponding one of the disk storage locations 20'–26', and if so, reads the directory data of the disk. For example, in FIG. 7, the first storage location icon 42 has a check mark next to it. In response to this, the driver program will perform the following disk associated check mark operations:

1. Instruct the CD changer to read the directory data of a first disk located in the first storage location 20', that is the first carriage 20, and transfer the directory data back to a memory of the personal computer 2.

2. Display a first disk icon 55 indicating that a disk is present in the first carriage 20 and is being read or has been already read.

The first disk icon 55 is shown as a combination of a figure of a CD with a number "1" next to it. Other configurations of disk icons may similarly be employed, including those without numbers that are aligned with a corresponding one of the storage location icons 42–48.

3. Instruct the CD changer to lock-out the first select button 7 after the reading of the directory data of the first disk is completed. This prevents a user from removing or changing the first disk so that the data stored in the memory of the computer is not rendered obsolete.

4. Display no disk icon if the CD changer 1 transmits a message to the personal computer 2 that there is no disk in the first carriage 20. As discussed above, the CD changer examines whether a disk is being stored in a respective carriage by the use of the disk detector 18 and stores this information in its memory.

Following the execution of the above four operations, the driver program will proceed to examine each storage location corresponding to a storage location icon with a check mark. Upon completion, disk icons, such as disk icons 55–57 in FIG. 7, will be displayed for each check marked storage location wherein a disk is presently stored. Those storage location icons with check marks, such as the sixth storage location icon 47, in FIG. 7, which do not have corresponding disks, will remain check marked, but no disk icon will be displayed associated with the storage location icon. Also, if a storage location does not have a disk present, its associated select button is not locked-out.

Once it has been determined that a storage location has a disk present and a disk icon has been displayed accordingly, the user then uses the mouse 5 to execute a program on the disk by double clicking on the associated disk icon. For example, execution of a program on the fifth disk is accomplished by the user placing the cursor 41 on the fifth disk icon 57 and clicking the mouse button 61 twice. The driver program proceeds to examine the directory information previously stored to execute an appropriate file from the fifth disk.

When a check marked storage location does not have a disk loaded in it, the user can proceed to install a disk in the given storage location using an appropriate one of the select buttons 7–13. For example, the sixth storage location 25', as discussed above, did not contain a disk. To load a disk in the sixth storage location 25', the user depresses the sixth select button 12 which has not been locked-out. The sixth carriage 25 is then removed to the eject position by the CD changer 1. The user then inserts a disk into the sixth carriage 25. The newly inserted disk is then brought to the load position in response to either the sixth select button 25 be depressed or the tray 15 being pushed into the CD changer 1. Once the newly inserted disk is in the load position, its directory information is read and stored in the personal computer 2, and a disk icon associated with the sixth storage location 25' is displayed. The sixth select button 12 is then locked-out and the newly inserted disk is stored in the magazine 19.

Once one of the storage location icons 42–48 is check marked and a disk icon is displayed to indicate that there is a disk present, a series of operations is required to eject the disk at the check marked storage location. For purposes of clarity, these operations will be discussed with reference to the first storage location 20' in the above example, however, it is understood that the operations apply to each of the storage locations 20–26. Since the first storage location 20' contained a disk when the check mark 50 was applied to the first storage location icon 42, the first select button 7 is locked-out. Therefore, the user will be prevented from ejecting the disk in the first carriage 20 by depression of the first select button 7. In order to eject the disk in the first carriage 20 the user must execute the eject operations outlined below.

EJECT OPERATION

1. Move the cursor near the first disk icon 55 and click the mouse button 61. If a plurality of disks are to be ejected, the shift-key (not-shown) on the keyboard 4, is held depressed during the clicking operation of the mouse 5. For example, the shift-key is depressed and then the mouse button 61 is clicked with the cursor 41 near the first disk icon 55. With the shift-key still depressed, the mouse 5 is moved to place the cursor 41 on the third disk icon 56 and the mouse button 61 is clicked.

2. The user then moves the mouse 5, which in turn moves each of the clicked-on disk icons, 55 and 56, in unison. Movement is then effected to deposit the clicked-on disk icons, 55 and 56, at a trash can icon 58 shown in the lower right hand corner of the display monitor 3. The user thus indicates that no more need exists for the disks held on the first and third carriages, 20 and 22. To use an analogy, the user indicates he wishes to "trash" the specified disk.

3. In response to operations 1 and 2 above, the driver program removes the first and third disk icons, 55 and 56, erases the stored directory information associated with the respective disks, and issues a command to the CD changer 1 to remove the lock-out of the respective select buttons 7 and 9. If a check mark is placed next to an "AUTOEJ" icon 49, then the following operations are executed.

AUTO-EJECT OPERATION

4. The lowest number carriage, of those carriages associated with a "trashed" disk, is selected and moved to the eject position. In the present example, the first carriage 20 is moved to the eject position.

5. The user either replaces the disk in the first carriage 20, or simply removes the disk leaving the first carriage 20 empty. The user then depresses the first select button 7, or pushes the tray 15 itself back into the CD changer 1, to restore the first carriage 20 in the magazine 19.

6. The next lowest carriage, of those carriages associated with a "trashed" disk, is selected by the driver program and moved to the eject position. In the present example, the third carriage 22 is moved to the eject position.

7. Above operations 5 and 6 are repeated until all carriages having "trashed" disks have been ejected and stored back in the magazine 19.

In the above operations, each new disk, inserted into a carriage having an existing check mark associated therewith, is read before being stored in the magazine. The directory data read from each disk then is transmitted to the personal computer 2 as previously discussed.

It is realized that the icons presented in the above embodiment may be altered or replace by alternative annunciators. For instance, instead of check marks being used, the storage location icons 42–48 may be changed to a different color or brightness. Similarly, the disc icons 55–57 need not have numbers displayed on them but may be positioned in alignment with their corresponding storage location icons. These, and other alterations, are realizable by those skilled in the art and are considered to be within the scope and spirit of the present invention.

The above description is an overview of the operation of the driver program for the CD changer 1. The following description explains in detail the steps associated with the above operations and the flow of the operating system of the driver program.

Figure 9:
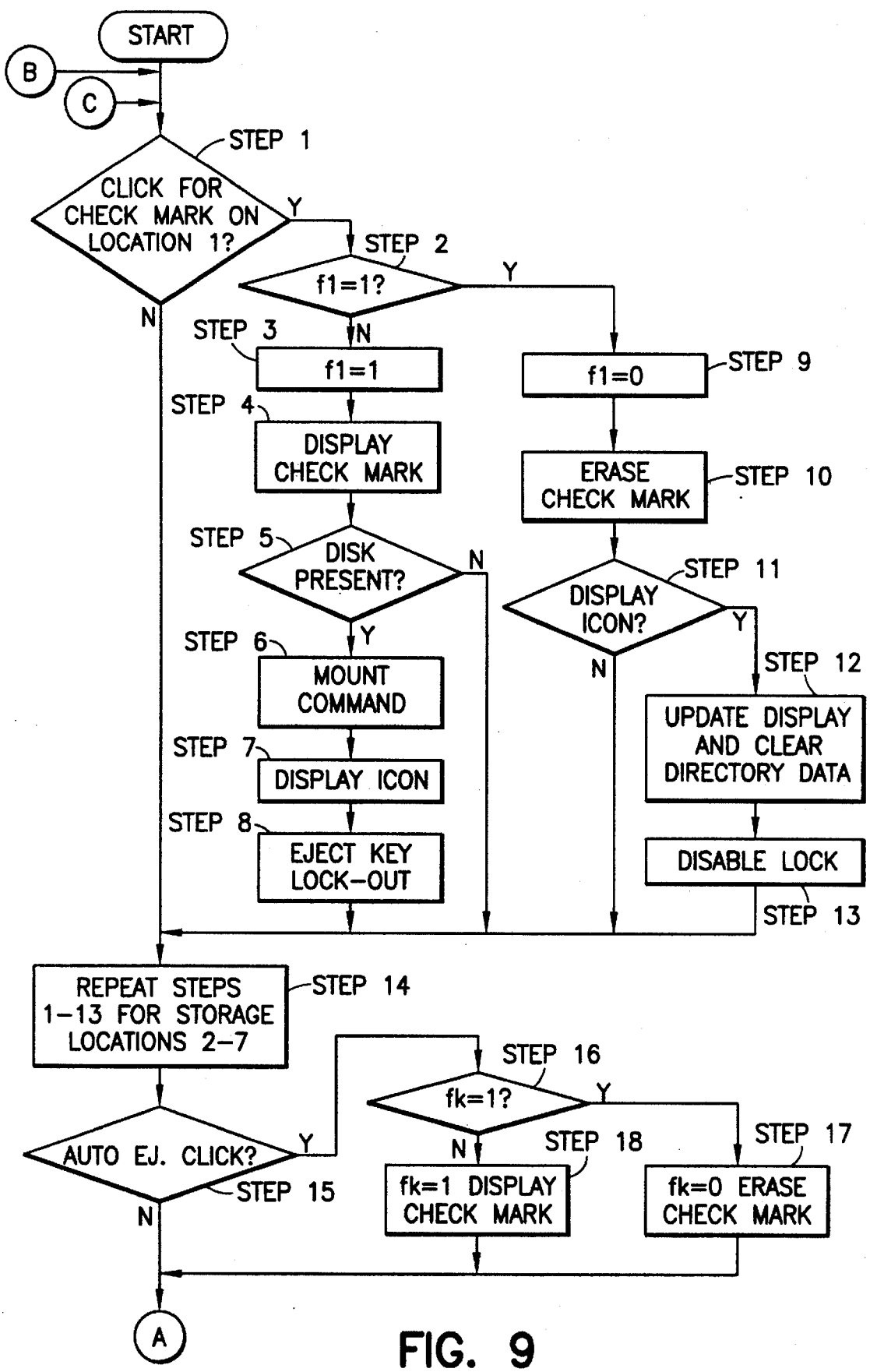
FIG. 9 is a flow-chart of a portion of a driver program of the present invention.

Referring to FIGS. 6, 7 and 9, execution of the driver program begins at step 1 wherein the personal computer 2 checks to see if the user executed a check-mark click on the first storage location icon 42. If such a click is detected, the execution flow proceeds to step 2 whereat a flag f1, associated with the first storage location icon 42, is examined to see if the flag f1 is set or not. If the flag f1 is not set, driver program execution proceeds to step 3 wherein the flag f1 is set to 1. Next, step 4 is executed to display a check mark associated with the first storage location icon 42. Step 5 is next executed to query the CD changer 1 as to whether a disk is present in the first carriage 20. If the CD changer 1 indicates that a disk is not present in the first carriage 20, driver program execution proceeds to step 14 discussed below. If however, the CD changer 1 indicates that a disk is present, step 6 is executed wherein the disk is transported to the load position and the directory data of the disk is read and transmitted to the personal computer 2 effecting a mounting operation. Step 7 is then executed to display the disk icon 55 associated with the first carriage 20. Finally, a lock-out command for the first select button 7 is sent to the CD changer 1 to instruct it to disable the first select button 7 to prevent a user from changing the disk to one not in agreement with the directory information stored in the personal computer 1. Driver program execution then proceeds to step 14, as discussed below.

Returning now to step 2, if the flag f1 is already set, the click is interpreted as a command to remove the check mark 50 from the first storage location icon 42. Therefore, driver program execution proceeds to step 9 wherein flag f1 is reset to 0. Next, the check mark 50 is removed from the display monitor at step 10. Step 11 checks whether there is an existing first disk icon associated with the first storage location icon 42. If a disk icon is present, step 12 is executed wherein the disk icon is removed from the display monitor 3 and the directory data of the first disk is cleared from the memory of the personal computer 1. At step 13 the lock-out on the first select button 7 is removed by sending an appropriate command to the CD changer 1. Driver program execution again proceeds to step 14.

At step 14, the above steps 1 through 13 are repeated for each of the other storage location icons 43–48 displayed on the display monitor 3. Thus, the driver program repeatedly executes the above steps for each of the first through seventh carriages, 20–26, of the CD changer 1 to monitor whether the user has entered a mouse click. Steps 1 through 14 implement the disk associated check mark operation described above as operations 1 through 4.

Following the execution of step 14, steps 15 to 18 address the enabling of the auto-eject feature described above. At step 15, the personal computer 2 examines whether a click command has been entered with the cursor 41 in the vicinity of an AUTOEJ icon 49 on the main driver screen 3'. If an auto-eject click is detected, driver program execution proceeds to step 16 wherein a flag fk is tested to see if it is in the set "1" or reset "0" state. The set state indicates that the auto-eject feature has already been enabled and that the present auto-eject click has been entered to disable the feature. Therefore, when the flag fk is found to be equal to "1" at step 16, flag fk is reset equal to "0" at step 17 and a check mark icon 54 is removed from the "AUTOEJ" icon area. Alternatively, the if the flag fk is not set at step 16, the flag fk is set at step 18 and the check mark icon 54 is displayed next to the "AUTOEJ" icon 49.

Figure 10:
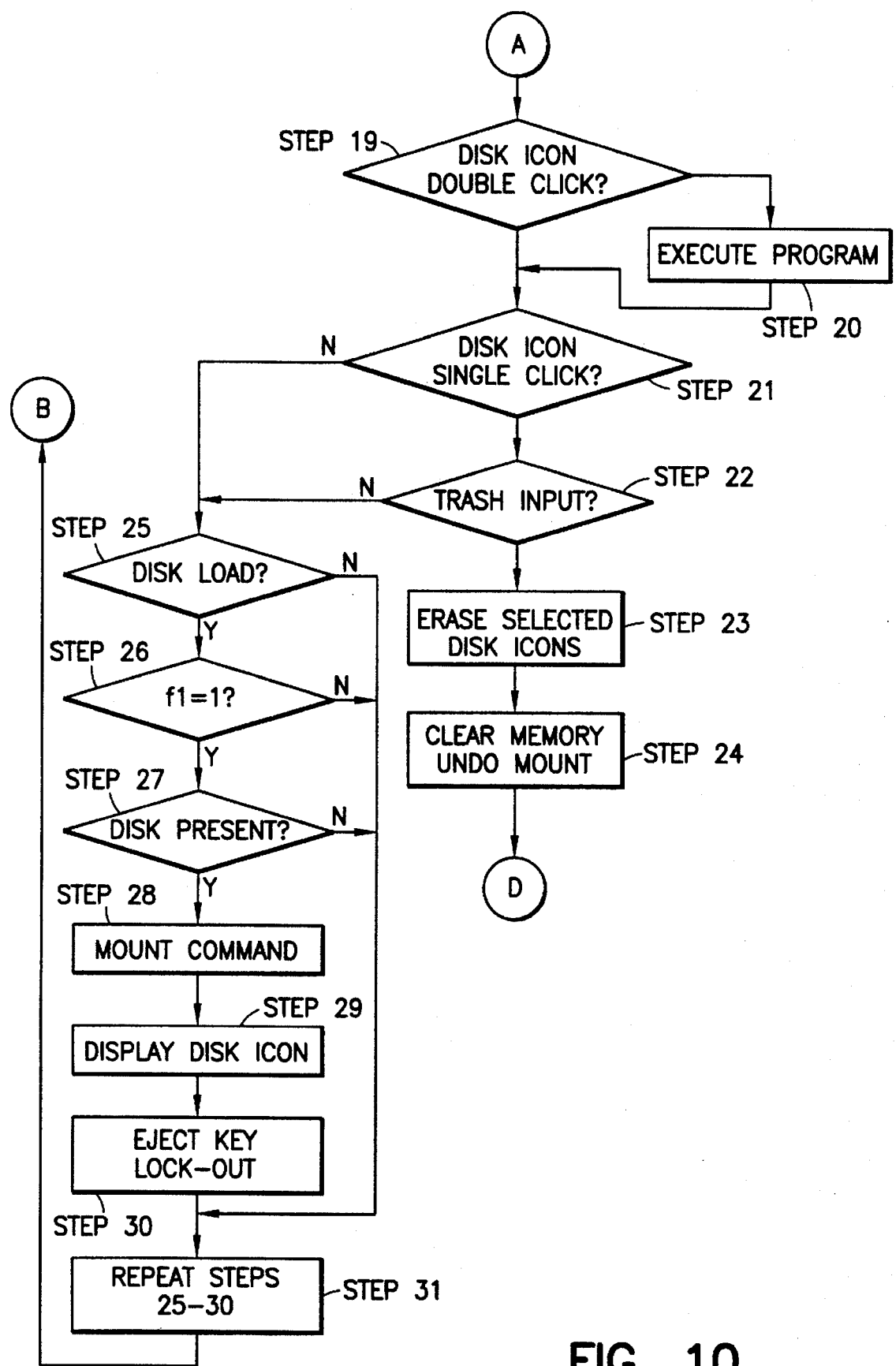
FIG. 10 is a flow-chart of another portion of the driver program of the present invention.

Referring to FIG. 10, driver program execution proceeds to step 19 wherein it is determined whether a double click entry associated with a displayed disk icon has been received. If such an entry has been made, the drive program proceeds to step 20 which executes an application program found on the disk icon which has been double clicked. For example, if the user desires to execute an application program on the disk in the first carriage 20, the user places the cursor 41 on the first disk icon 55 and presses the mouse button 61 twice. The driver program will then proceed to execute the application program on the disk in the first carriage 20.

The ejection of a disk is controlled by steps 21–24 of the driver program. At step 21, the personal computer checks whether a single click on one of the displayed disc icons has been detected. If a disc icon single click has been detected, the driver program proceeds to step 22 where the detection of a "trashing" of the clicked upon disk icons is determined. If neither of these operations are performed, control goes to step 25 which begins a sequence of steps, 25–31, associated with disk loading discussed below. Alternatively, in response to a "trashing" of a disc icon, the driver program executes step 23 which erases the disc icon from the screen. Step 24 is executed to erase the directory data of the "trashed" disk from the memory of the personal computer 2. For example, if the user depressed the shift key (not shown), clicked on the first, third, and fifth disk icons, 55–57, moved the icons to the trash can icon 58, and then clic the first, third and fifth disk would be "trashed", that is destined to be ejected.

Figure 11:
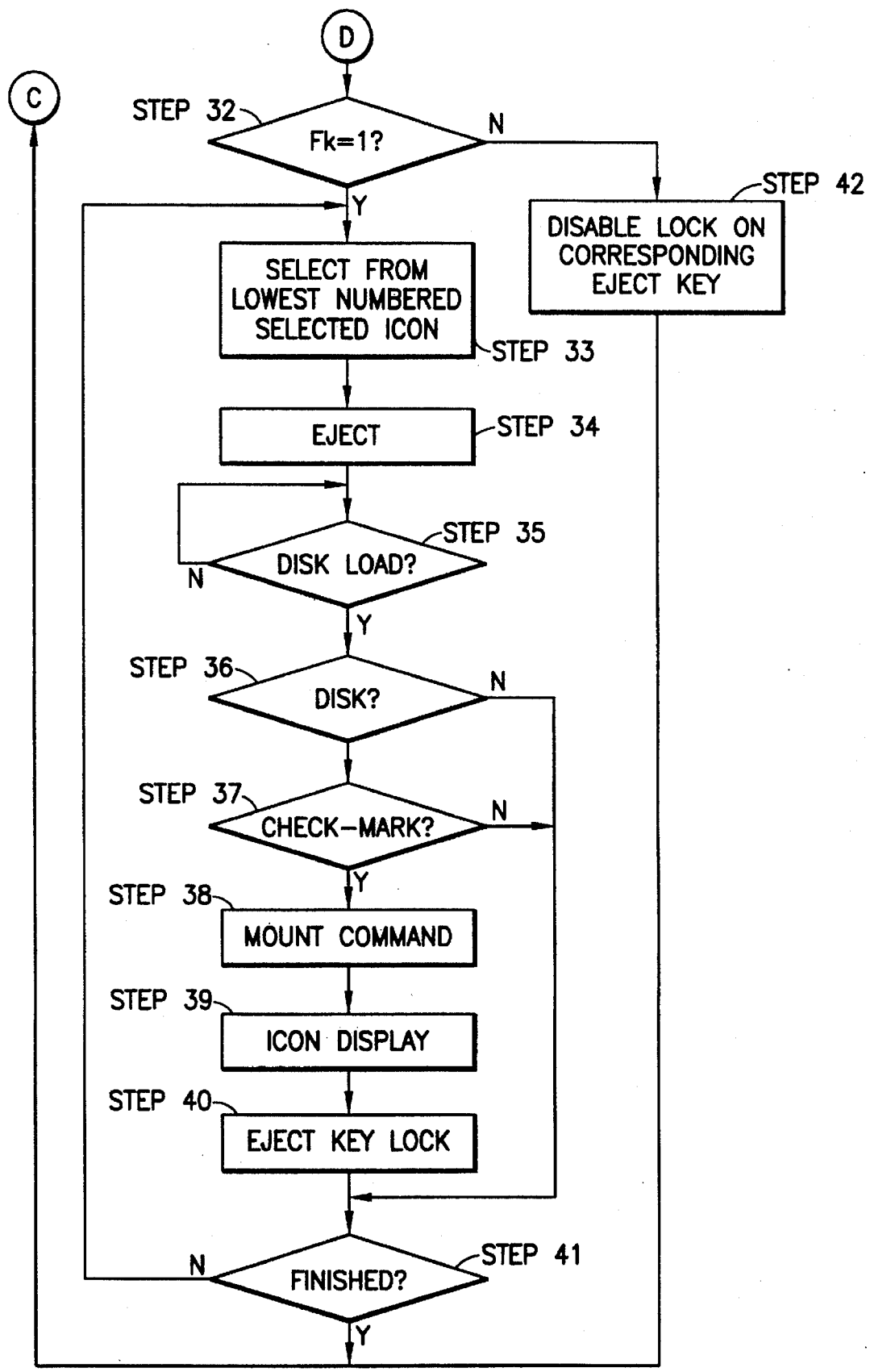
FIG. 11 is a flow-chart of still another portion of the driver program of the present invention.

Referring to FIG. 11, execution from step 24 proceeds to step 32 which tests the flag fk to determine whether the auto-eject feature is enabled. If the flag fk is not set, that is equal to "1", then the auto-eject feature has not been enabled and the driver program next executes step 42 which sends a command to the CD changer 1 to remove the lock-out on one of the select buttons 7–13 corresponding to the "trashed" disk. Driver program execution then returns to step 1.

When step 32 determines that the auto-eject feature is enabled, step 33 next determines which of a possible plurality of "trashed" icons has the lowest number. In step 34, the lowest number "trashed" icon is then ejected by the personal computer 2 by sending an appropriate eject command to the CD changer 1. Once the carriage corresponding to the lowest number "trashed" disk icon has been moved to the eject position, steps 35 through 40 are executed effecting a disk loading routine. In the present example, the first carriage 20 would be moved to the eject position.

At step 35, the CD changer is repeatedly queried as to whether the tray 15 has been loaded back into the CD changer 1 either by the user pressing the tray itself into the CD changer or by pressing a corresponding one of the select buttons 7–13. Once the CD changer 1 indicates that the tray 15 has been retracted from the eject position, the personal computer 2 then polls the CD changer 1 to determine whether a disk is present in the tray 15. If a disk is present, the driver program then determines whether the associated disk location icon has a check mark. If either the disk or the check mark is not present, driver program execution bypasses the remainder of the disk loading steps, stores the carriage, and proceeds to step 41.

When a disk is both present and has a check mark associated with it, the driver program proceeds to step 38 wherein the disk is clamped in the disk reader assembly 17' and its directory information is read and stored in the personal computer 2. Next, step 39 displays the appropriate disk icon for the carriage presently selected. In the case of the example presented above, the first disk icon 55 would be displayed as this is the lowest number disk icon "trashed". Step 40 is then executed sending a command to the CD changer 1 to lock-out operation of the first select button 7 associated with the presently selected carriage.

Following one of steps 36, 37 and 40, step 41 is executed wherein it is determined whether all the "trashed" disk icons have been processed by the above procedure. So far, in the present example, only the first carriage 20 has been ejected, therefore, driver program operation would return to step 33 and the third disc icon 56 would be processed. Once all the "trashed" disk icons have been processed, the driver program returns to step 1.

In the present embodiment, input from the mouse 5 is ignored during the auto-eject operation, steps 33 through 41. However, alternative embodiment of the present invention can handle mouse input during the auto-eject operation. In such an embodiment, the auto-eject operation may either be canceled or postponed in order to address the mouse input. An interrupt procedure is implemented to detect a mouse click. Additionally, the mouse input may be stored to be addressed after the auto-eject operations is complete. Such variations are considered to be within the scope and spirit of the present invention.

An auto-load feature is also realizable in view of the above program operation. The user selects various disk location icons by mouse or keyboard input to identify which are to be sequentially loaded. Then, the presence of a disk at a given location is checked only to see if directory data must be deleted and operations proceed as detailed above.

Referring again to FIG. 10, if in steps 21 and 22, a disc icon symbol or a disc icon "trashing" has not been detected then the driver program execution proceeds to steps 25 through 31 addressing disk loading of the first carriage 20. For example, if the first storage icon 42 is check marked, but a disk was not present in the first carriage 20, the user may press the first select button 7 to eject the first carriage 20 for loading. An alternative embodiment of the present invention may additionally provide for the "trashing" of storage location icons 42–48 so that disks in the storage locations which have not been tagged by check marks may be similarly ejected by the auto-eject feature.

A storage location associated by a storage location icon without a check mark may be loaded or unloaded by the depression of an associated select button since there is no lock-out applied to the operation of the associated select button. In the present example, the second storage location icon 43, shown in FIG. 7, does not have a check mark. Therefore the user can depress the second select button 8, shown in FIG. 2, to perform an eject operation on the second carriage 21 to either load or unload the second carriage 21.

At step 25, the CD changer is queried as to whether the tray 15 holds the first carriage 20 and whether it is loaded back into the CD changer 1, either by the user pressing the tray itself into the CD changer or by pressing a corresponding one of the select buttons 7–13. Once the CD changer 1 indicates that the tray 15 has been retracted from the eject position, the personal computer determines at step 26 whether the first carriage 20 has a check mark associated with its corresponding first storage location icon 42. The check mark condition is determined by examining whether the flag f1 is set or reset as discussed above. If the flag f1 is set, the CD changer 1 is polled in step 27 to determine whether a disk is present in the tray 15. If any one of steps 25 through 27 has a negative outcome, driver program execution proceeds to step 31 where loading of the next highest number carriage is addressed in sequence.

If a disk is present in the first carriage 20, the driver program then proceeds to step 27 to effect a mounting operation commanding the CD changer 1 to clamp the disk in the disk reader assembly 17', read the directory information, and transmit the directory information into the memory of the personal computer 2. Next, step 29 is executed, displaying the first disc icon 55 on the main driver screen 3', followed by step 30 wherein a first selection button lock-out command is sent to the CD changer 1. Step 31 then repeats the above steps 25 through 30 for each of the six other carriages. Once these loading steps are completed, the driver program returns to step 1.

While the above embodiment addresses the use of CD ROM's it is realized that the present invention includes embodiments operating on other types of storage media. For example, embodiments using recordable and erasable floppy disks or hard magnetic disks are considered to be within the scope and spirit of the present invention.

According to the present invention, clamping a disk in the reader and reading directory information from the disk is automatically performed only on disks corresponding to those storage location icons checked marked by the user. This permits improved ease of use since unnecessary reading of disks is avoided. The disks are only read when required by the user.

Furthermore, the present invention provides ease of use and error free operation. Disks are individually stored in the magazine 19 without removing the magazine 19 from the CD changer 1. Prior art devices require removal of a magazine for disks to be loaded. Such operation can result in the unintentional replacement of an incorrect disk and a resulting disagreement between the stored disk and the stored directory data. This problem is eliminated in the present invention since disks are individually ejected by the CD changer 1 which keeps track of the affect storage locations. The prior art devices cannot track what disk changes are made when their magazines are removed from their chassis. In the present invention, disks which have been read and their directory information stored, i.e. mounted, cannot be ejected without the corresponding storage location icon being untagged by removal of a check mark associated with the given storage location icon.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position; display means for displaying information;

control means for controlling said disk changer and said display means; said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk; and said control means further including means for displaying a check mark symbol associated with said disk storage location symbols when said storage location symbols are placed in said first state.

2. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position;

display means for displaying information;

control means for controlling said disk changer and said display means;

said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk; and said control means further including means for indicating said data has been read from said disk at one of said plurality of disk storage positions corresponding to one of said disk storage location symbols in said first state.

3. The disk changer system of claim 2 wherein said means for indicating includes means for displaying a disk shaped icon associated with said one of said disk storage location symbols in said first state.

4. The disk changer system of claim 2 wherein:

said disk changer includes means for installing and removing a selected disk from said magazine; and said control means includes means for disabling said disk changer from removing a selected disk from said magazine when said data has been read from said selected disk.

5. A disk changer system for storing and playing disks comprising:

a disk changer;

said disk changer including a magazine for storing disks at a plurality; of disk storage locations within said magazine;

said disk changer including means for reading a selected disk of the disks stored within the magazine when said selected disk is at a playback position;

said disk changer including a transport system for transporting disks between said magazine, said playback position, and an eject position; display means for displaying information;

control means for controlling said disk changer and said display means; said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk;

means for installing and removing a selected disk from said magazine; and said control means further including means for disabling said disk changer from removing a selected disk from said magazine when said data has been read from said selected disk.

6. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position; display means for displaying information;

control means for controlling said disk changer and said display means;

said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk;

said disk changer including means for installing and removing a selected disk from said magazine; and said control means further including means for controlling said disk changer to effect sequential removal and installation of disks, from selected disk storage locations, in response to user input selecting said selected disk storage locations.

7. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position;

display means for displaying information;

control means for controlling said disk changer and said display means;

said control means including a memory.;

means for inputting data to said control means and said memory;

said control means including means for displaying disk storage location symbols, on said display means, wherein each the disk storage location symbols correspond to a respective one of said disk storage locations; and said control means including loading control means, responsive to selection of selected ones of said disk storage location symbols, for actuating said disk changer to accept a disk external to said disk changer, read data on said disk, transfer said data to said memory, and store said disk at one of said plurality of disk storage positions corresponding to one of said selected ones of said disk storage location symbols;

said disk changer including means for installing and removing a selected disk from said magazine; and said control means further including means for disabling said disk changer from removing a selected disk from said magazine when said data has been read from said selected disk.

8. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position;

display means for displaying information;

control means for controlling said disk changer and said display means;

said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk;

said control means including means for indicating said data has been read from said disk at one of said plurality of disk storage positions corresponding to one of said disk storage location symbols in said first state;

said disk changer including means for installing and removing a selected disk from said magazine;

said control means including means for disabling said disk changer from removing a selected disk from said magazine when said data has been read from said selected disk;

said means for installing and removing including input means for selecting a selected disk storage location, of said disk storage locations, to effect removal of a disk at said selected disk storage location; and said means for disabling said disk changer locking-out operation of said input means associated with removing said selected disk from said magazine when said data has been read from said selected disk.

9. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position; display means for displaying information;

control means for controlling said disk changer and said display means;

said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk;

said control means including means for indicating said data has been read from said disk at one of said plurality of disk storage positions corresponding to one of said disk storage location symbols in said first state;

said disk changer including means for installing and removing a selected disk from said magazine;

said control means including means for disabling said disk changer from removing a selected disk from said magazine when said data has been read from said selected disk; and said control means including means for controlling said disk changer to effect sequential removal and installation of disks, from selected disk storage locations, in response to user input selecting said selected disk storage locations.

10. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position;

display means for displaying information;

control means for controlling said disk changer and said display means;

said control means including a memory;

means for inputting data to said control means and said memory;

said control means including means for displaying disk storage location symbols, on said display means, wherein the disk storage location symbols each correspond to a respective one of said disk storage locations;

said control means including means, responsive to said means for inputting, for displaying said disk storage location symbols in one of a first state and a second state;

said control means including first loading control means, responsive to said disk storage location symbols in said first state, for actuating said disk changer to accept a disk external to said disk changer at said eject position, read data on said disk, transfer said data to said memory, and store said disk at one of said plurality of disk storage positions corresponding to one of said disk storage location symbols in said first state;

said control means including second loading control means, responsive to said disk storage location symbols in said second state, for actuating said disk changer to store a disk external to said disk changer at said eject position into one of said plurality of disk storage positions, corresponding to said one of said disk storage location symbols in said second state, without reading said disk;

said disk changer including means for installing and removing a selected disk from said magazine;

said control means including means for disabling said disk changer from removing a selected disk from said magazine when said data has been read from said selected disk;

said means for installing and removing controlling said transport system;

said means for installing and removing including input means for selecting a selected disk storage location, of said disk storage locations, to effect removal of a disk at said selected disk storage location; and said means for disabling said disk changer locking-out operation of said input means associated with removing said selected disk from said magazine when said data has been read from said selected disk.

11. A disk changer system for storing and playing disks comprising:

a disk changer;

said disk changer including a magazine for storing disks at a plurality of disk storage locations within said magazine;

said disk changer including means for reading a selected disk of the disks stored within the magazine when said selected disk is at a playback position;

said disk changer including a transport system for transporting disks between said magazine, said playback position, and an eject position;

display means for displaying information;

control means for controlling said disk changer and said display means;

said control means including a memory;

means for inputting data to said control means and said memory;

said control means including means for displaying disk storage location symbols, on said display means, wherein each the disk storage location symbols correspond to a respective one of said disk storage locations;

said control means including loading control means, responsive to selection of selected ones of said disk storage location symbols, for actuating said disk changer to accept a disk external to said disk changer, read data on said disk, transfer said data to said memory, and store said disk at one of said plurality of disk storage positions corresponding to one of said selected ones of said disk storage location symbols;

said disk changer including means for installing and removing a selected disk from said magazine;

said control means including means for disabling said disk changer from removing a selected disk from said magazine when said data has been read from said selected disk;

said means for installing and removing including means for controlling said transport system;

said means for installing and removing including input means for selecting a selected disk storage location, of said disk storage locations, to effect removal of a disk at said selected disk storage location; and said means for disabling said disk changer locking-out operation of said input means associated with removing said selected disk from said magazine when said data has been read from said selected disk.

* * * * *